June 9, 1942.        N. C. JECKEL        2,285,980
URETERAL CATHETER
Filed July 25, 1939
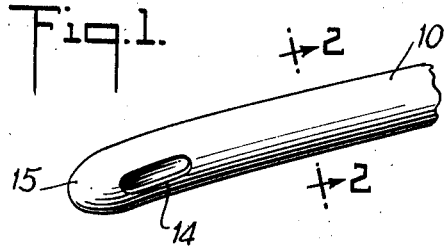
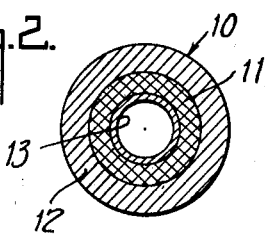
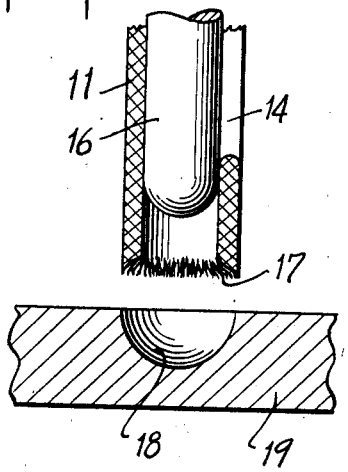
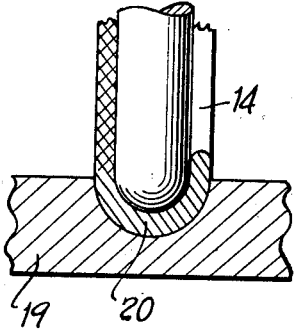
INVENTOR
NORMAN CHARLES JECKEL
BY
*Gluck + Breitenfeld*
ATTORNEYS Patented June 9, 1942

2,285,980

UNITED STATES PATENT OFFICE 2,285,980

URETERAL CATHETER

Norman Charles Jeckel, Yonkers, N. Y., assignor to American Cystoscope Makers, Inc., New York, N. Y., a corporation of New York Application July 25, 1939, Serial No. 286,353

7 Claims. (Cl. 128—349)

My present invention relates generally to surgical devices, and has particular reference to ureteral catheters.

Catheters of this general class, being intended for insertion through one of the ureteral channels of the human body, must be unusually small in cross-section. The outer diameter cannot be much greater than about one-tenth of an inch, and may be considerably less; while the inner diameter is approximately half this size. The catheter as a whole should be flexible, yet of sufficient rigidity to permit its endwise insertion; the outer surface should be smooth and polished; and the catheter should be capable of sterilization. Near its forward end, there are at least one, and usually two, openings or eyes, and the forward tip should be closed and smoothly rounded to facilitate insertion.

It has heretofore been the custom to construct these catheters of a braided tube of natural silk, reinforced by a coating of natural gum or its equivalent; and such catheters have for years been accepted as satisfactory.

I have found that the use of natural silk results in certain shortcomings which have not been fully recognized. For example, the provision of a really smooth and rounded tip at the forward end of the catheter is difficult. Where a so-called "olive" tip is desired, the forward end of the braided silk tube must be bound with additional thread to seal the end and to produce an approximation of the desired shape. Where an ordinary tip is desired, the forward end of the braided tube must be similarly tied into closed condition, or undue reliance must be placed upon the action of the gum coating to seal this end, but in each case, the results are, generally speaking, ununiform and unworkmanlike.

So far as the small openings or eyes are concerned, they must either be produced by braiding, during the initial braiding of the tube, which is expensive even when special machinery is employed, or they must be deliberately cut into the tube, with consequent irregularities and raw edges susceptible to raveling.

Moreover, since silk is deleteriously affected by water, and has proven to be extremely susceptible to the destructive action of urine, it has always been necessary to attempt a complete coating of the silk tube, both on the outside and the inside. A thorough and unbroken coating on the inside, however, because of the extremely small diameter of the tube, is difficult and usually impossible to achieve, and defects are obviously incapable of detection. A customary procedure has heretofore resided in dipping one end of the braided tube into a varnish or gum, and allowing the gum to travel by capillary action up through the wall of the tube. By this means, it is hoped that the entire tube will become impregnated with the protective material, but experience has shown me that this procedure is unreliable. Catheters usually fail, in practice, by destruction or impairment of the silk from the inside, indicating an initial failure to coat and protect the silk thoroughly on the inside.

Also, the fibrous and fuzzy character of natural silk, creating the capillarity upon which the foregoing procedure depends, is itself the cause of a further disadvantage, because the fuzziness on the outside of the tube prevents the application of a thoroughly smooth and unbroken homogeneous reinforcing coating. The fine fibers project out through the coating that is applied and not only impair its smoothness but interrupt its homogeneity and prevent the formation of a really unbroken film.

In accordance with my present invention, these, and other, disadvantages may be obviated, and certain new and hitherto unenjoyed advantages may be achieved.

One feature of my invention lies in the provision of a flexible fabric tube which is composed of braided filaments or threads of a material which is meltable. As a result, the provision of a smoothly rounded closed tip at the forward end of the catheter is a matter of unusual simplicity. No binding or "whipping" is necessary, and no reliance need be placed upon any coating material with which the tube may subsequently be treated. The end of the braided tube is merely subjected to the action of a suitably heated tool or die, whereby the raw filament ends are melted, and are allowed or caused to flow together into a smooth homogeneous mass. By the employment of a die having the desired configuration, this melted mass may, upon rehardening, embody any desired contour, such as an "olive" tip, a so-called "whistle" tip, or the like. The tip is not only reliably sealed, and utterly smooth, but it is uniformly of predetermined configuration and size.

In the provision of the eyes of the catheter, the meltable character of the fabric tube may be of similar advantage. An eye need not be initially braided into the tube by the braiding operation, but may, if desired, be produced by merely piercing the tube at the desired point with a suitably heated tool. This tool may have any predetermined shape or size, and by melting the filaments with which it comes in contact, it may be caused to produce an eye of any predetermined shape or size, with no raw edges. As a matter of fact, the edges are entirely smooth and homogeneous. Even where an eye is initially braided into the tube, such a heated tool may be employed, if desired, to enlarge the eye or otherwise alter its shape, the rehardened edge of the eye being always smooth and nicely rounded.

By the term "meltable" I intend to distinguish from those materials, such as rayon, which become merely sticky upon application of heat; and by this term I mean to refer to an ability to become actually fluid upon application of a tool or the like heated above the melting point of the material.

In carrying out my invention, any material of meltable character may be employed, so long as it is available in the form of fine filaments or threads which are capable of being braided into tubular form. I have found it preferable, however, to employ the material which is now available on the market under the name of "Nylon," and which is described in U. S. Patent 2,130,948, issued September 20, 1938, as being a polyamide obtained by condensation polymerization from a diamine and a dibasic carboxylic acid.

This material is particularly advantageous because, in addition to being available in filament form, and being meltable, it is also non-fibrous, and highly resistant to the action of both water and urine. As a result, the outer reinforcing coating that is applied to the braided tube to destroy its limp character and to impart the desired yieldable strength and rigidity to the catheter, is capable of forming an entirely homogeneous and thoroughly unbroken surface layer, and the resultant catheter therefore has a much smoother and more highly polished surface, of thoroughly impervious and rugged character, imparting great strength and durability to the catheter.

Moreover, while it is desirable to coat the inside of the fabric tube to provide a smooth sanitary lining, and to impart greater strength to the catheter, no serious impairment results if minor defects in the inner coating remain undetected, because of the inherent resistance of the fabric tube to the action of water and urine.

I deem it to be preferable that the material of the fabric tube be unreactive toward the material of the reinforcing coating, and where the formation of this coating involves heat treatment, the material of the fabric tube should be resistant to such heat and should have a melting point higher than any temperature to which it may be subjected during the coating operation. For these added reasons, I prefer to employ the material known as "Nylon," not only because it is entirely unreactive toward these resins, such as vinyl, phenolic, or other synthetic resins, or their equivalents, which have proven advantageous for this purpose, but also because it is resistant to the heat usually required to bake such reinforcing coatings, and because it has a melting point above 260° F., which is about the highest temperature at present usually employed during the formation of a baked reinforcing coating of this character. Furthermore, I have found that the baked coating adheres admirably to a base tube made of "Nylon." I am unprepared to state the exact reason for this, but it may be that the "Nylon" softens just sufficiently, during the baking procedure, to permit an intimate bonding of the resin coating to the fabric tube.

The accompanying drawing is intended merely for the purpose of illustrating the general nature of my invention.

Figure 1 is a perspective view of the forward end of a catheter constructed in accordance with the invention.

Figure 2 is an enlarged cross-sectional view taken, for example, along the line 2—2 of Figure 1;

Figure 3 is a fragmentary cross-section through the end of a braided fabric tube during the process of sealing the tip; and Figure 4 is a view similar to Figure 3 showing a further step in this process.

The catheter 10 illustrated in Figures 1 and 2 is composed of a fabric tube 11 of the character hereinbefore mentioned, viz., a tube composed of braided filaments of a meltable material. After the coating procedure this tube bears a coating 12 on the outside and a coating 13 on the inside, as indicated in Figure 2, the coating material serving to impart the desired strength, flexibility, body, and smoothness to the finished catheter.

At 14 I have illustrated an eye or opening of the character that is usually found at the forward end of a catheter of this type. A similar eye is arranged on the opposite side of the catheter, slightly farther from the tip. This second eye is not visible in Figure 1.

At 15 I have illustrated the smooth closed tip of the catheter. I have chosen to illustrate an ordinary tip, but it will be understood that any desired type or shape of tip may be provided for.

In Figures 3 and 4 I have shown the manner in which my present invention permits the production of the sealed tip in a reliable and uniform manner. In these figures, the fabric tube 11, with the eye 14 braided therein, is shown mounted upon a mandrel 16. The raw severed end 17 of the tube projects slightly beyond the end of the mandrel 16. This end is brought toward and pressed into a cavity 18 in a suitably heated die or tool 19, as a result of which the filaments or threads melt and merge as shown in Figure 4, producing a homogeneous mass 20 of predetermined shape and smooth character, ready for the final coating operation.

It will be understood that the cavity 18 may be of any predetermined shape or character, depending upon the result desired. Under certain circumstances, the use of a specially prepared die may be entirely dispensed with, and the operation may be performed by a heated tool manually wielded.

In general, it will be understood that changes in the details, herein described and illustrated for the purpose of explaining the nature of my invention, may be made by those skilled in the art without departing from the spirit and scope of the invention as expressed in the appended claims. It is, therefore, intended that these details be interpreted as illustrative, and not in a limiting sense.

Having thus described my invention, and illustrated its use, what I claim as new and desire to secure by Letters Patent is:

1. A ureteral catheter comprising a flexible tube composed of braided filaments of a meltable material.

2. A ureteral catheter comprising a flexible tube composed of braided filaments of a meltable material, the catheter having a closed tip composed of a melted and rehardened mass of said material.

3. A ureteral catheter comprising a flexible tube composed of braided filaments of a meltable material, said tube being reinforced by an unbroken homogeneous flexible coating of a material unreactive toward that of the tube.

4. A ureteral catheter comprising a flexible tube composed of braided filaments of a meltable material, said tube being reinforced by an unbroken homogeneous flexible baked coating, the tube material being resistant to the heat required to bake said reinforcing coating.

5. A ureteral catheter comprising a flexible tube composed of braided filaments of a meltable material whose melting point is above 260° F., and which is non-fibrous, and resistant to the action of water and urine.

6. A ureteral catheter comprising a flexible tube composed of braided filaments of a meltable material whose melting point is above 260° F., and which is non-fibrous, and resistant to the action of water and urine, said material being a polyamide obtained by condensation polymerization from a diamine and a dibasic carboxylic acid.

7. A ureteral catheter comprising a flexible tube composed of braided filaments of a meltable non-fibrous material, the catheter having a closed tip composed of a melted and rehardened mass of said material, said tube being reinforced by an unbroken homogeneous flexible baked resinous coating, the tube material being resistant to the action of water and urine and to the heat required to bake said reinforcing coating.

NORMAN CHARLES JECKEL.